US009615040B2

(12) United States Patent
Demandolx et al.

(10) Patent No.: US 9,615,040 B2
(45) Date of Patent: Apr. 4, 2017

(54) DETERMINING A MAXIMUM INSCRIBED SIZE OF A RECTANGLE

(71) Applicant: Microsoft Technology Licensing, LLC, Redmond, WA (US)

(72) Inventors: Denis Demandolx, Bellevue, WA (US); Thomas Lund Dideriksen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/970,472

(22) Filed: Dec. 15, 2015

(65) Prior Publication Data

US 2016/0191831 A1     Jun. 30, 2016

Related U.S. Application Data

(63) Continuation of application No. 13/523,926, filed on Jun. 15, 2012, now Pat. No. 9,245,348.

(51) Int. Cl.
| | | |
|---|---|---|
| G06K 9/46 | (2006.01) |
| H04N 5/374 | (2011.01) |
| G06T 7/00 | (2017.01) |
| G06T 5/50 | (2006.01) |
| H04N 5/262 | (2006.01) |

(52) U.S. Cl.
CPC ............ *H04N 5/3741* (2013.01); *G06T 5/50* (2013.01); *G06T 7/0083* (2013.01); *H04N 5/2625* (2013.01); *G06T 2207/20132* (2013.01)

(58) Field of Classification Search
CPC ............ H04N 5/23248; H04N 5/2355; H04N 5/3741; H04N 5/2625
See application file for complete search history.

(56) References Cited

U.S. PATENT DOCUMENTS

| | | |
|---|---|---|
| 5,276,783 A | 1/1994 | Fossum |
| 6,520,647 B2 | 2/2003 | Raskar |
| 6,701,306 B1 | 3/2004 | Kronmiller |
| 6,733,138 B2 | 5/2004 | Raskar |
| 6,811,264 B2 | 11/2004 | Raskar et al. |
| 7,301,540 B1 | 11/2007 | Deming |
| 7,443,421 B2 * | 10/2008 | Stavely ............ H04N 5/23248 348/208.1 |
| 7,460,130 B2 | 12/2008 | Salganicoff |

(Continued)

OTHER PUBLICATIONS

Christiian Knauer et al., Largest Inscribed Rectangles in Convex Polygons, Mar. 22-24, 2010, 26th European Workshop on Computational Geometry, pp. 1-4.

(Continued)

*Primary Examiner* — Gregory M Desire

(57) ABSTRACT

Embodiments perform an iterative process for enlarging a rectangle having a fixed aspect ratio within a convex polygon to find the largest rectangular area within the convex polygon. The iterative process includes detecting an intersection of one or more corners of the rectangle with the convex polygon and adjusting a position of the rectangle based on the quantity of intersecting corners. The iterative growth process continues until a maximum inscribed size of the rectangle has been determined. Some embodiments process images from bracketed photography and crop areas outside the determined maximum inscribed size when combining the images into a single image.

20 Claims, 7 Drawing Sheets

(56) References Cited

U.S. PATENT DOCUMENTS

| | | | |
|---|---|---|---|
| 7,782,393 B2* | 8/2010 | Ward | H04N 5/2355 |
| | | | 348/296 |
| 7,825,971 B2 | 11/2010 | Hynecek | |
| 7,840,057 B2 | 11/2010 | Gallatin | |
| 8,451,297 B2 | 5/2013 | Chae et al. | |
| 9,245,348 B2* | 1/2016 | Demandolx | G06T 7/0083 |
| 2009/0021533 A1 | 1/2009 | Guerzhoy et al. | |
| 2009/0073279 A1* | 3/2009 | Ui | H04N 3/155 |
| | | | 348/222.1 |
| 2009/0140122 A1* | 6/2009 | Suzuki | H04N 5/37457 |
| | | | 250/201.2 |
| 2010/0225783 A1 | 9/2010 | Wagner | |
| 2011/0134242 A1 | 6/2011 | Loubser et al. | |
| 2012/0062773 A1* | 3/2012 | Cieslinski | H04N 5/378 |
| | | | 348/300 |
| 2013/0063622 A1* | 3/2013 | Schoeberl | H04N 5/23248 |
| | | | 348/222.1 |
| 2013/0335555 A1 | 12/2013 | Demandolx et al. | |
| 2015/0055887 A1 | 2/2015 | Hasegawa | |

OTHER PUBLICATIONS

Wandell, et al., "Common Principles of Image Acquisition Systems and Biological Vision", Retrieved at <<http://ieeexplore.ieee.org/stamp/stamp.jsp?tp=&arnumber=982401>>, Proceedings of the IEEE, Jan. 2002, pp. 5-17.

"Non-Final Office Action Issued in U.S. Appl. No. 13/523,926", Mailed Date: Apr. 7, 2015, 15 Pages.

"Notice of Allowance Issued in U.S. Appl. No. 13/523,926", Mailed Date: Sep. 14, 2015, 8 Pages.

* cited by examiner

DETERMINING A MAXIMUM INSCRIBED SIZE OF A RECTANGLE

CROSS-REFERENCE TO RELATED APPLICATION

This application is a continuation of U.S. application Ser. No. 13/523,926, filed Feb. 12, 2013, the entirety of which is hereby incorporated by reference herein.

BACKGROUND

Existing systems are capable of combining several individual images taken in a burst into a single combined image. For example, the existing systems combine images of the same scene taken during high dynamic range, flash/no-flash, or other types of bracketed photography. Some of the existing systems register the individual images by translation and/or rotation in an attempt to compensate for global motion occurring during the image capture. The registered images are then overlaid or otherwise intersected to produce a combined image. The combined image produced by the existing systems, however, is often non-rectangular in shape. Converting the non-rectangular intersection of the images into a rectangular shape having the same aspect ratio as the individual input images is difficult with the existing systems.

SUMMARY

Embodiments of the disclosure find the largest crop rectangle within a convex polygon. A computing device iteratively enlarges a rectangle inscribed within the convex polygon while maintaining a fixed aspect ratio for the rectangle. The iterative enlarging continues until at least one corner of the rectangle first intersects at least one edge of the convex polygon. The computing device determines how many corners have intersected or touched an edge of the convex polygon. The computing device identifies a maximum inscribed size of the rectangle by resuming the iterative enlarging of the rectangle while moving the rectangle within the convex polygon based on the quantity of corners touching an edge of the convex polygon. The iterative enlarging continues until the maximum inscribed size has been reached (e.g., the rectangle can no longer be inscribed within the convex polygon).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure determine the largest, axis-aligned rectangle of a given aspect ratio inside a convex polygon. In some embodiments, a computing device 202 iteratively enlarges and adjusts a position of a crop rectangle or other rectangle within the convex polygon until the rectangle reaches a maximum inscribed size.

Aspects of the disclosure are operable in a plurality of environments. For example, the computing device 202 operates on input images 102 obtained from high dynamic range photography, flash/no-flash image pairs, and other forms of bracketed photography in which several images 102 or frames from a burst capture are combined together to produce a single image. Aspects of the disclosure are further operable, however, with any form of bracketing including, but not limited to, focus bracketing, depth-of-field bracketing, white balance bracketing, or ISO bracketing.

While examples are described herein with reference to finding the largest rectangle that fits within a given convex polygon, aspects of the disclosure are also operable to find the largest size of other shapes within the given convex polygon. For example, some embodiments may find the largest square capable of being inscribed within the convex polygon.

Figure 1:
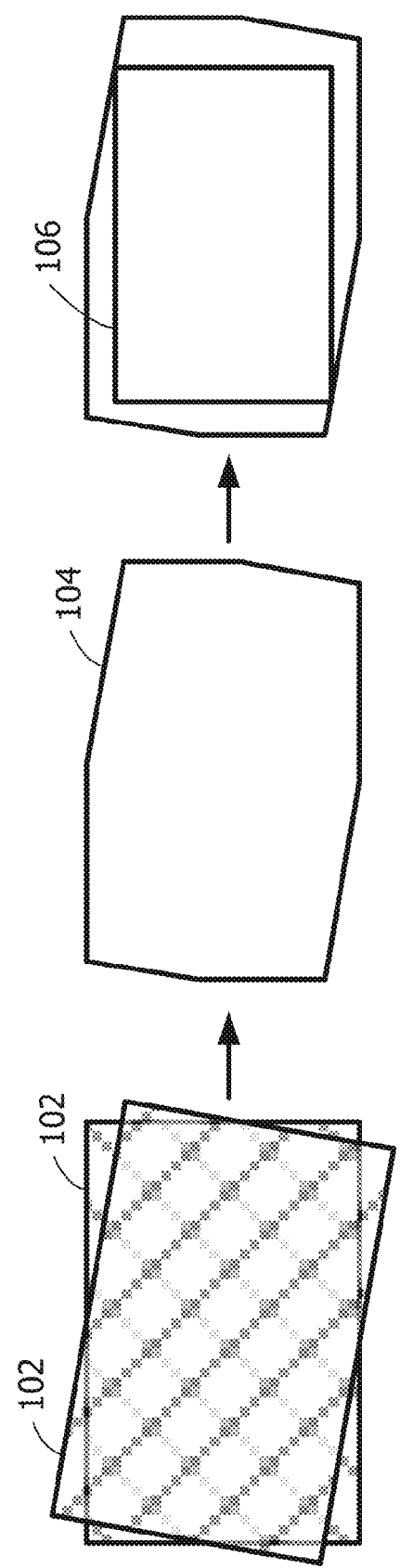
FIG. 1 is an exemplary block diagram illustrating the intersection of images to produce a convex polygon in which a rectangle can be inscribed.

Referring next to FIG. 1, an exemplary block diagram illustrates the intersection of images 102 to produce an exemplary convex polygon 104 in which a rectangle 106 can be inscribed. While examples are described herein with reference to images 102 taken in a burst, to consecutive image captures of the same scene, or to other groups of related images 102, aspects of the disclosure are operable with any plurality of images 102. For example, the images 102 may be taken at approximately the same time or at different times (e.g., one image 102 of a scene taken during the day and another image 102 of the same scene taken at night). In FIG. 1, at least two images 102 have been overlaid or otherwise intersected to produce the convex polygon 104. Areas outside the convex polygon 104 have been removed in FIG. 1 for clarity. Embodiments of the disclosure operate to identify, determine, calculate, compute, or otherwise find the largest rectangle 106 within the convex polygon 104.

Figure 2:
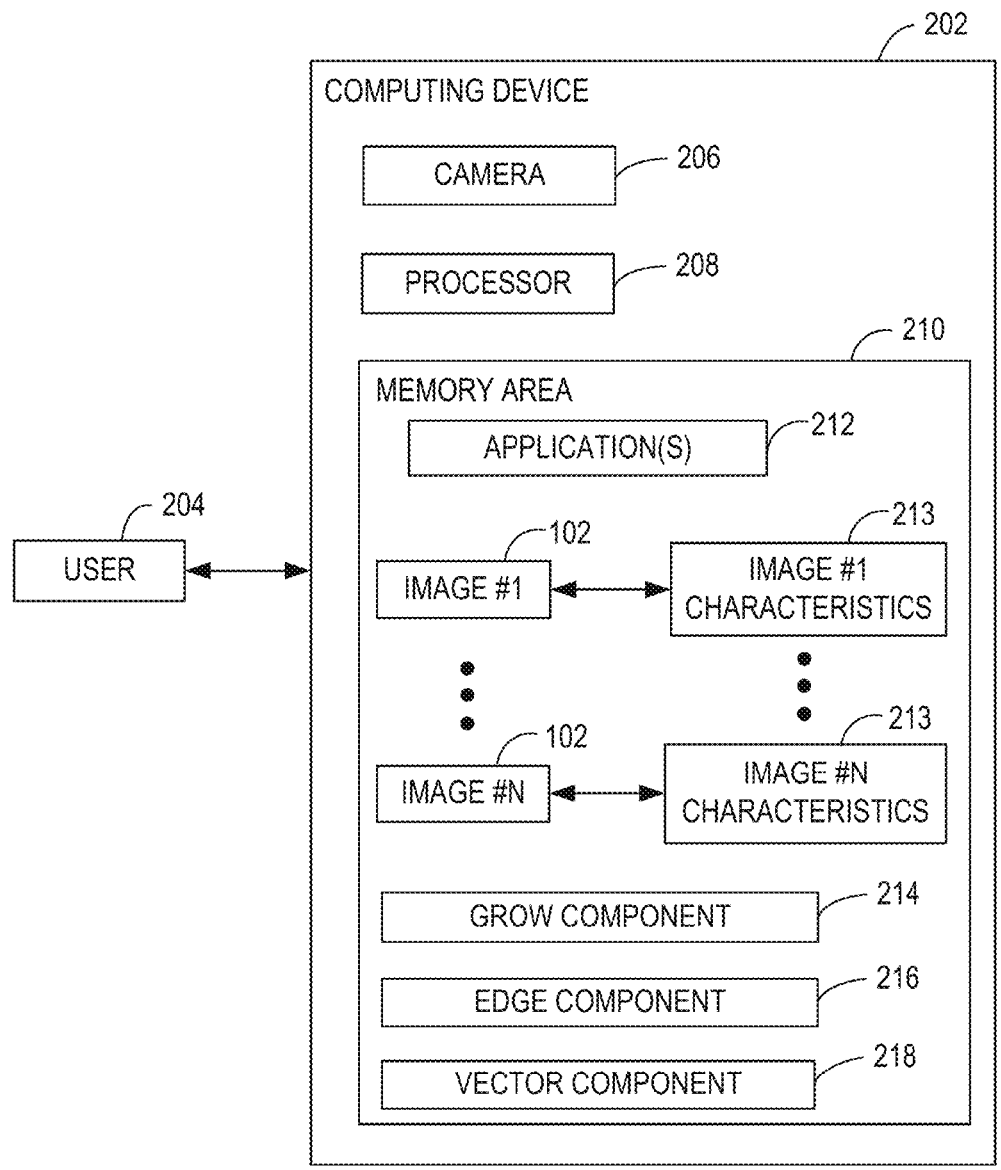
FIG. 2 is an exemplary block diagram illustrating a computing device for processing images to identify a maximum inscribed size of a rectangle within a convex polygon formed from the images.

Referring next to FIG. 2, an exemplary block diagram illustrates the computing device 202 for processing images 102 to identify a maximum inscribed size of a rectangle within a convex polygon formed from the images 102. In the example of FIG. 2, the computing device 202 associated with a user 204 represents a system for finding a largest crop rectangle within a convex polygon. The computing device 202 represents any device executing instructions (e.g., as application programs, operating system functionality, or both) to implement the operations and functionality associated with the computing device 202. The computing device 202 may include a mobile computing device or any other portable device. In some embodiments, the mobile computing device includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

In some embodiments, the computing device 202 has at least one camera 206, at least one processor 208, and at least one memory area 210. The camera 206 includes any device or apparatus for capturing still images 102 or video, with or without audio. The camera 206, or computing device 202, may have auxiliary lighting such as a flash for activation when capturing the images 102. The camera 206, or computing device 202, may be capable of various configurations or settings for capturing the images 102. For example, the camera 206 may be capable of capturing images 102 at multiple exposures, multiple apertures (e.g., F-stops), etc.

Figure 3:
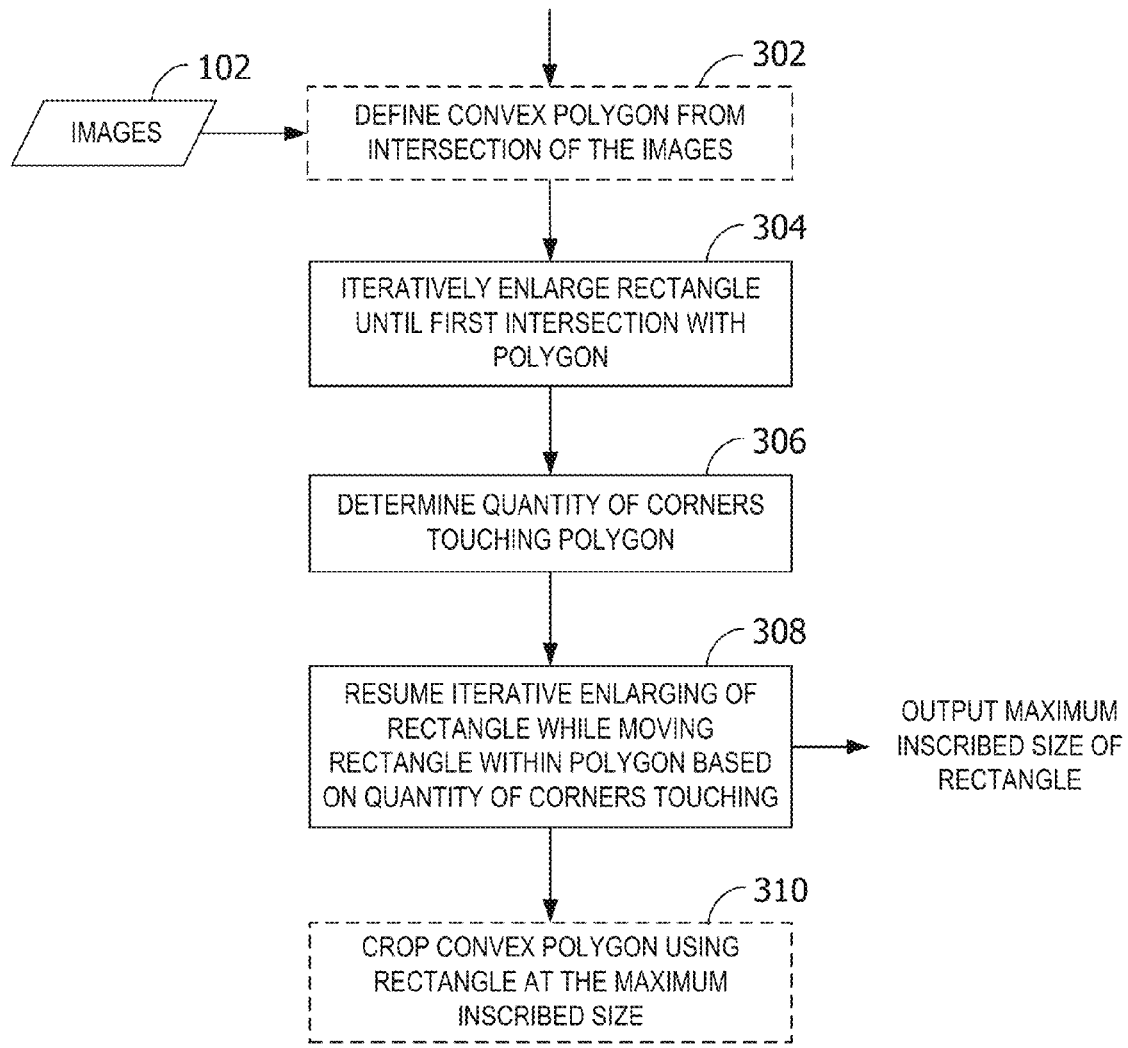
FIG. 3 is an exemplary flow chart illustrating operation of the computing device to determine the maximum inscribed size of a crop rectangle and to optionally crop a convex polygon.
Figure 4:
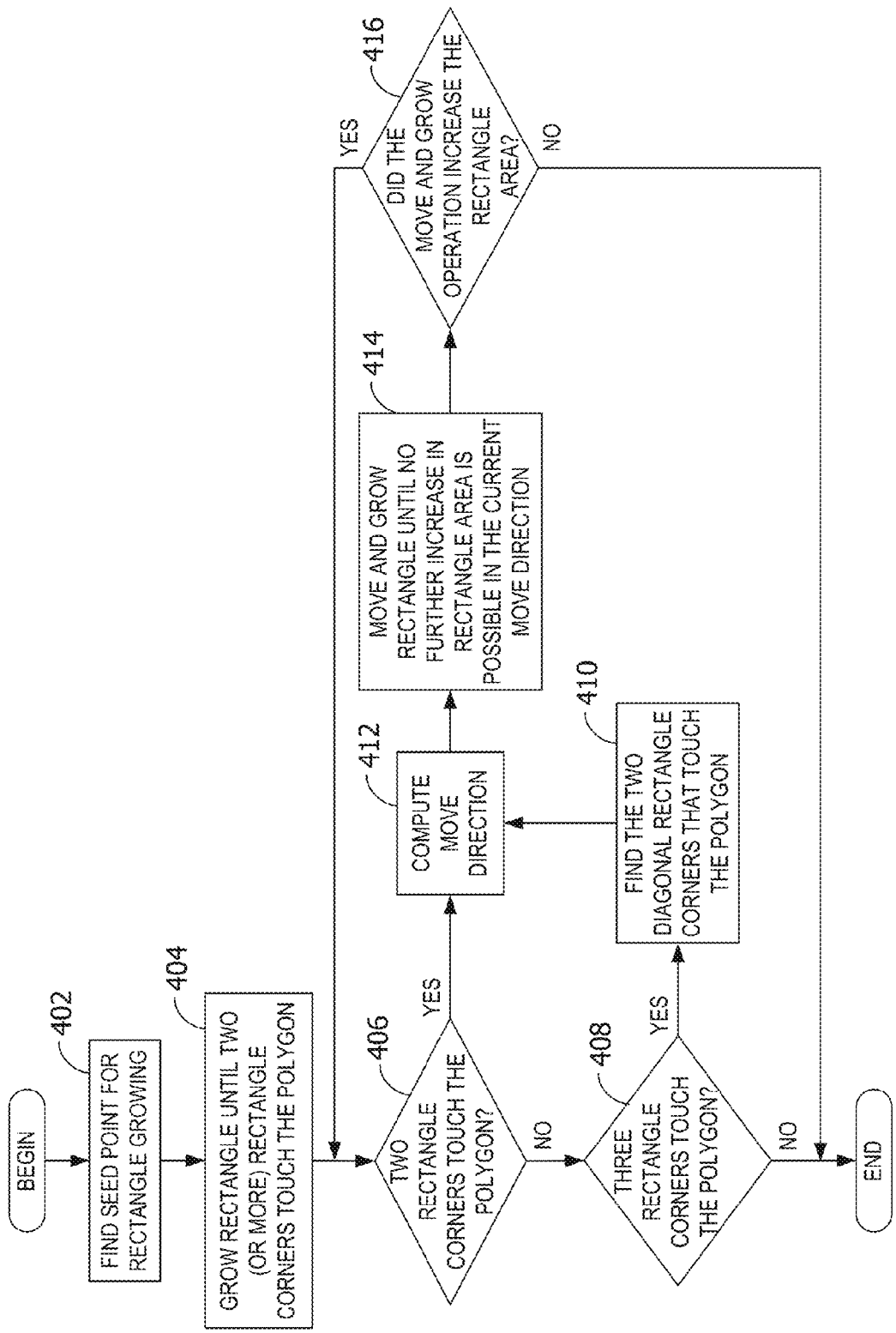
FIG. 4 is an exemplary flow chart illustrating operation of the computing device to perform scaling and translation of a rectangle within a convex polygon.

While the computing device 202 in FIG. 2 is shown to include the camera 206 and to perform functionality such as described in FIG. 3 and FIG. 4, other embodiments are contemplated. For example, aspects of the disclosure are operable with a digital camera that has a processor, or otherwise communicates with a device that has a processor, for implementing the functionality illustrated in FIG. 3 and FIG. 4. In another example, aspects of the disclosure may be performed by a cloud computing system receiving the images 102 from the computing device 202 or any other capture device.

The processor 208 includes any quantity of processing units or types of processing entities, and is programmed to execute computer-executable instructions for implementing aspects of the disclosure. The instructions may be performed by the processor 208 or by multiple processors executing within the computing device 202, or performed by a processor external to the computing device 202. In some embodiments, the processor 208 is programmed to execute instructions such as those illustrated in the figures (e.g., FIG. 3 and FIG. 4).

In some embodiments, the processor 208 or other components of the computing device 202 represents an implementation of analog techniques to perform the operations described herein. For example, the operations may be performed by an analog computing device and/or a digital computing device.

The computing device 202 further has one or more computer readable media such as the memory area 210. The memory area 210 includes any quantity of media associated with or accessible by the computing device 202. The memory area 210 may be internal to the computing device 202 (as shown in FIG. 2), external to the computing device 202 (not shown), or both (not shown). In some embodiments, the memory area 210 includes read-only memory and/or memory wired into an analog computing device.

The memory area 210 stores, among other data, one or more applications 212. The applications 212, when executed by the processor 208, operate to perform functionality on the computing device 202. Exemplary applications 212 include mail application programs, web browsers, calendar application programs, address book application programs, messaging programs, media applications, location-based services, search programs, and the like. The applications 212 may communicate with counterpart applications or services such as web services accessible via a network. For example, the applications 212 may represent downloaded client-side applications that correspond to server-side services executing in a cloud.

The memory area 210 further stores a plurality of the images 102, such as image #1 through image #N, and a corresponding plurality of image characteristics 213, such as image #1 characteristics through image #N characteristics. The images 102 may be captured by the computing device 202 via the camera 206, or received by the computing device 202 from another entity (e.g., a capture device). In embodiments in which the images 102 are received by the computing device 202, the computing device 202 may not have the camera 206. Each of the image characteristics 213 corresponds to at least one of the images 102. The image characteristics 213 represent metadata describing the images 102. Exemplary image characteristics 213 include, but are not limited to, values representing size, format, aspect ratio, type, compression type, and compression ratio. The image characteristics 213 may be calculated, discovered, determined, or received by the computing device 202.

Exemplary images 102 include a flash image (e.g., one of the images 102 taken while activating a flash or other light source), and a no-flash image (e.g., one of the images 102 taken without the flash). In some embodiments, a plurality of the images 102 of substantially the same scene may be grouped together or otherwise associated. Each of the images 102 in such a group may have been taken with different camera 206 configurations such as different exposures.

Further, while aspects of the disclosure are described with reference to images 102 captured by the computing device 202, aspects of the disclosure are operable with any images 102 from any source or combination of sources. For example, in some embodiments, the images 102 represent frames sampled from a video stream or other video source.

The memory area 210 further stores one or more computer-executable components. Exemplary components include a grow component 214, an edge component 216, and a vector component 218. Operation of these components is described below with reference to FIG. 3.

Referring next to FIG. 3, an exemplary flow chart illustrates operation of the computing device 202 to determine the maximum inscribed size of a crop rectangle and optionally crop a convex polygon. At 302, the computing device 202 defines a convex polygon encompassing an intersection of the input images 102. The images 102 may be aligned prior to intersection. For example, translation and/or rotation may be performed on the images 102 (e.g., from their original, as-captured form). The translation and/or rotation may be part of image registration to align the images 102 relative to one or more regions of interest (e.g., faces, buildings, user-define regions, etc.) within the images 102. In some embodiments, the computing device 202 overlays each of the images 102 to produce the convex polygon. Areas outside the convex polygon may be cropped or otherwise ignored. Operation 302 is optional because in other embodiments, rather than the computing device 202 defining the convex polygon, another entity provides the convex polygon as input to the computing device 202.

At 304, the computing device 202 iteratively enlarges or grows a rectangle within the convex polygon. While enlarging the rectangle, the computing device 202 maintains a fixed aspect ratio for the rectangle in some embodiments. The fixed aspect ratio corresponds to a desired aspect ratio for a final image. For example, the fixed aspect ratio may be defined to equal an aspect ratio associated with one or more of the images 102 used to define the convex polygon.

The computing device 202 maintains the rectangle about an origin or seed point within the convex polygon during the iterative growth process. In some embodiments, the computing device 202 calculates a center of gravity of the convex polygon and defines the seed point to be the calculated center of gravity.

The computing device 202 continues enlarging the rectangle until at least one corner of the rectangle intersects or touches at least one edge of the convex polygon. The computing device 202 determines how many corners of the rectangle are touching edges at 306. For example, two, three, or four corners of the rectangle may simultaneously touch edges of the convex polygon. In another example, just one corner may intersect an edge.

At 308, the computing device 202 resumes the iterative growth or enlarging of the rectangle started at 304 while moving the rectangle within the convex polygon based on the determined quantity of corners touching the convex polygon. For example, the rectangle may be moved along a translation vector defined as described below with reference to FIG. 4. The computing device 202 calculates the translation vector based on the determined quantity of corners touching the convex polygon.

For example, on determining that one corner of the rectangle intersects the convex polygon, resuming the iterative enlarging of the rectangle includes iteratively enlarging the rectangle while fixing a current position of the rectangle until another corner intersects the convex polygon or the maximum inscribed size has been reached. As another example, on determining that two corners of the rectangle intersect the convex polygon, iteratively moving and enlarging the rectangle includes defining a translation vector based on the edges intersected by the two corners and iteratively moving and enlarging the rectangle along the defined translation vector. In still another example, on determining that three corners of the rectangle intersect the convex polygon, the computing device 202 identifies two of the three corners that are diagonally opposed to each other and defines a translation vector based on the edges intersected by two of the three corners, The computing device 202 then iteratively moves and enlarges the rectangle along the defined translation vector.

The computing device 202 continues to iteratively enlarge the rectangle until the rectangle can no longer be inscribed within the convex polygon, or is otherwise about to exceed the convex polygon. For example, the computing device 202 stops enlarging the rectangle when the next growth iteration will result in a corner of the rectangle exceeding the convex polygon. The computing device 202 stores, presents, and/or outputs the maximum inscribed size of the rectangle. The maximum inscribed size represents an optimum size of the rectangle given the input images 102.

At 310, the computing device 202 may optionally crop the convex polygon using the rectangle at its maximum inscribed size. For example, areas within the convex polygon yet outside the rectangle at its maximum inscribed size may be cropped or otherwise ignored.

One or more of the operations illustrated in FIG. 3 may be performed by the computer-executable components illustrated in FIG. 2. For example, the grow component 214, when executed by the processor 208, causes the processor 208 to iteratively enlarge, by a growth step during or with each of the iterations, a rectangle inscribed within a convex polygon while maintaining a fixed aspect ratio for the rectangle and until at least one corner of the rectangle first intersects at least one edge of the convex polygon. The growth step may correspond to any unit of measure, factor, or size. For example, the growth step may correspond to a quantity of pixels. In some embodiments, the size of the growth step remains fixed throughout each iteration of the rectangle growth process. In other embodiments, the size of the growth step changes during some iterations of the rectangle growth process, as next described.

The edge component 216, when executed by the processor 208, causes the processor 208 to determine a quantity of the corners intersecting edges of the convex polygon. The vector component 218, when executed by the processor 208, causes the processor 208 to identify a maximum inscribed size of the rectangle by resuming the iterative enlarging, by a reduced growth step, of the rectangle while moving the rectangle within the convex polygon based on the determined quantity of the corners and until the rectangle can no longer be inscribed within the polygon. The vector component 218 calculates the reduced growth step with each iteration.

In some embodiments, the reduced growth step corresponds to one-half of the growth step used by the grow component 214. For example, a growth step N may be reduced by one-half, or any other factor, with each move-and-enlarge iteration performed by the vector component 218 (e.g., a growth step of N pixels for one iteration, one-half N pixels for the next iteration, one-quarter N pixels for the next iteration, etc.). This factor-based growth strategy ensures rapid convergence to the maximum inscribed size. For example, from an algorithm complexity standpoint, the number of iterations to reach the maximum is proportional to log(N). In other embodiments, the growth step may be reduced by a factor that remains fixed with each iteration. The factor may also be based on a size of the convex polygon.

The vector component 218 may further calculate, based on the determined quantity of the corners, at least two candidate translation vectors for moving the rectangle during the iterative growth process. The vector component 218 employs each of the candidate translation vectors in separate iterative growth processes and compares the inscribed sizes resulting therefrom (e.g., a first inscribed size, a second inscribed size, etc.). The largest of the inscribed sizes produced in this manner is identified, selected, and/or output. For example, the vector component 218 may fork, spawn another thread, or serially execute to evaluate each of the candidate translation vectors.

In other embodiments, the vector component 218 employs just one of the candidate translation vectors. If the size of the rectangle increases after an iteration, the vector component 218 continues using the same candidate translation vector to grow the rectangle. If, however, the size of the rectangle does not increase after a defined quantity of iterations (e.g., one or two), the vector component 218 attempts to grow the rectangle using another candidate translation vector. In such embodiments, additional candidate translation vectors are used only when a first candidate translation vector does not result in an increase in size of the rectangle.

The computing device 202 may also include a user interface component. In some embodiments, the user interface component includes a graphics card for displaying data to the user 204 (e.g., displaying the convex polygon and/or rectangle) and receiving data from the user 204. The user interface component may also include computer-executable instructions (e.g., a driver) for operating the graphics card. Further, the user interface component may include a display (e.g., a touch screen display) and/or computer-executable instructions (e.g., a driver) for operating the display. The user interface component may also include one or more of the following to provide data to the user 204 or receive data from the user 204: speakers, a sound card, the camera 206, a microphone, a vibration motor, one or more accelerometers, a BLUETOOTH brand communication module, global positioning system (GPS) hardware, and a photoreceptive light sensor. For example, the user 204 may input commands or manipulate data by moving the computing device 202 in a particular way.

Referring next to FIG. 4, an exemplary flow chart illustrates operation of the computing device 202 to perform scaling and translation of a rectangle within a convex polygon. At 402, the computing device 202 finds or otherwise defines a seed point within the convex polygon from which a crop rectangle is to be grown. In some embodiments, the computing device 202 calculates a center of gravity for the convex polygon and defines the seed point to be the calculated center of gravity.

The computing device 202 iteratively grows, scales, or otherwise enlarges the rectangle, centered about the seed point, until at least one corner of the rectangle touches an edge of the convex polygon. In some embodiments, the computing device 202 iteratively grows the rectangle with a dynamic growth step to accelerate the growing process. For example, the computing device 202 initially grows the rectangle in steps of N. When the rectangle first touches the convex polygon, the next growth iteration occurs at a reduced growth step such as one-half of N. The computing device 202 reduces the growth step again (e.g., in half) after the rectangle touches another edge of the convex polygon. The growth step continues to be reduced in this manner until the largest rectangle that fits within the convex polygon is found, or the growth step reaches a pre-defined minimum growth step.

If only one corner of the rectangle touches the convex polygon (not shown in FIG. 4), the computing device 202 continues growing the rectangle while maintaining contact between the rectangle and the convex polygon at the touching corner. The point of contact effectively becomes the seed point, or center of growth. After one or more growth iterations, at least one additional corner touches or intersects an edge of the convex polygon. That is, the computing device 202 enlarges the rectangle until at least two corners of the rectangle are now touching the convex polygon at 404.

If four of the rectangle corners are touching edges of the convex polygon, the computing device 202 stops the iteratively growth process and the current size of the rectangle, or the size of the rectangle during the last iteration that did not exceed the convex polygon, is returned as the maximum rectangle size (not shown) and the process terminates.

Figure 5:
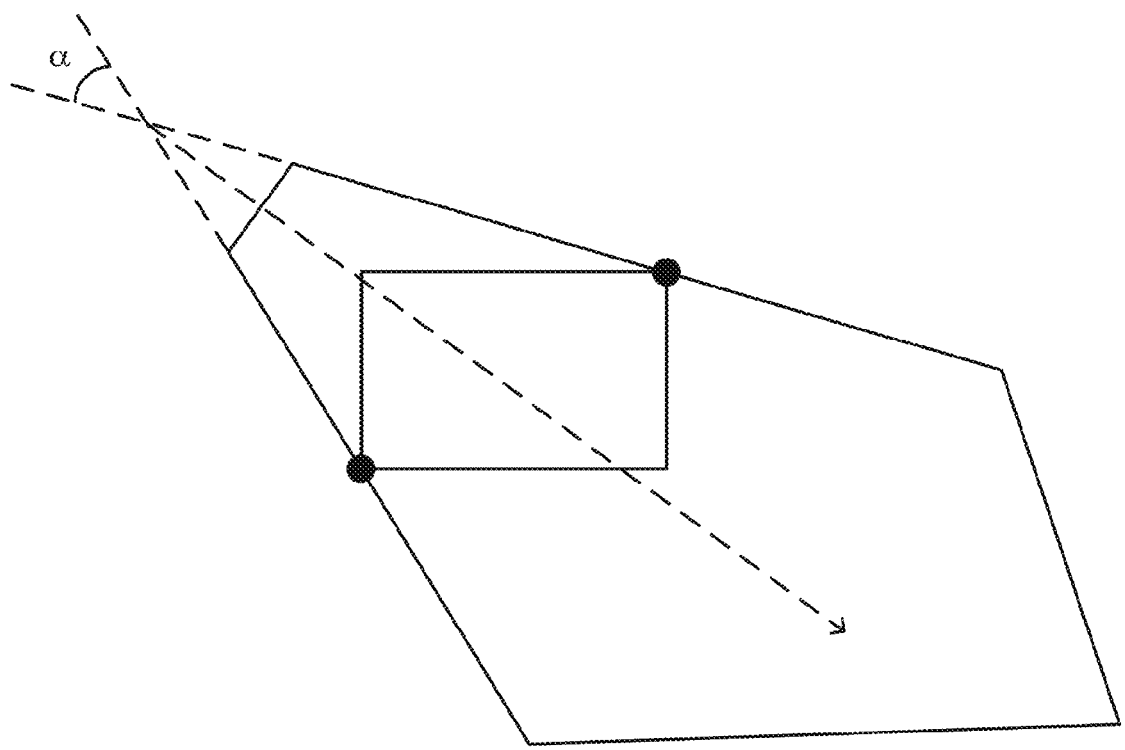
FIG. 5 is an exemplary diagram illustrating computation of a translation vector for iteratively moving a rectangle while enlarging the rectangle when two corners intersect the convex polygon.

Otherwise, if two corners of the rectangle touch edges of the convex polygon at 406, the computing device 202 attempts to move the rectangle within the convex polygon to allow for additional growth or enlargement of the rectangle. In particular, the computing device 202 determines a translation vector or otherwise computes a move direction at 412. In some embodiments, the computing device 202 measures or calculates an angle $\alpha$ between the two edges of the convex polygon touched by the rectangle, and computes the translation vector based on the measured angle $\alpha$. For example, referring next to FIG. 5, an exemplary diagram illustrates computation of the translation vector for iteratively moving the rectangle while enlarging the rectangle. As shown in FIG. 5, the computing device 202 determines the direction or orientation of the translation vector based on one-half the measured angle $\alpha$ (e.g., the bisection).

At 414, the computing device 202 performs iterative move and grow operations to move the rectangle along the translation vector while enlarging the rectangle until no further increase in rectangle area is possible in the direction of the translation vector. For example, the computing device 202 iteratively moves the rectangle along the translation vector. In some embodiments, the computing device 202 iteratively moves and grows the rectangle with the dynamic growth step as described above to accelerate the growing process. For example, the computing device 202 reduces the growth step (e.g., by one-half) each time the rectangle touches an edge of the convex polygon. The growth step continues to be reduced in this manner until the largest rectangle that fits within the convex polygon is found, or the growth step reaches a pre-defined minimum growth step.

In each iteration, the computing device 202 moves the rectangle by the growth step (e.g., possibly resulting in one or both of the touching corners to no longer intersect edges of the convex polygon), and then enlarges the rectangle by the growth step. The move and grow iterations continue to increase the rectangle area until the maximum rectangle size on the current translation vector is found. If the current translation vector resulted in at least some additional rectangle area at 416, the computing device 202 attempts the move and grow operations again, but along a new translation vector. For example, when at least two corners once again touch edges of the convex polygon (e.g., re-performing operation 406), the computing device 202 computes a new translation vector (e.g., re-performing operation 412) given a current position of the rectangle and proceeds to iteratively move and grow the rectangle along the new translation vector (e.g., re-performing operation 414). For example, another angle $\alpha$ is measured or calculated between the two edges of the convex polygon touched by the two corners of the rectangle. The computing device 202 computes the new translation vector based on the measured angle $\alpha$ and performs the iterative move and grow operations along the new translation vector.

If the most recent translation vector did not result in any increase in rectangle area at 416, the computing device 202 concludes that no further rectangle enlargement is possible and the process terminates.

If three corners of the rectangle touch edges of the convex polygon at 408 instead of two corners, the computing device 202 identifies two of the three touching corners that are diagonal from each other at 410. The computing device 202 performs the iterative move and grow operations as described above (e.g., at least operations 412, 414, and 416) using the two diagonal corners as input.

Figure 6:
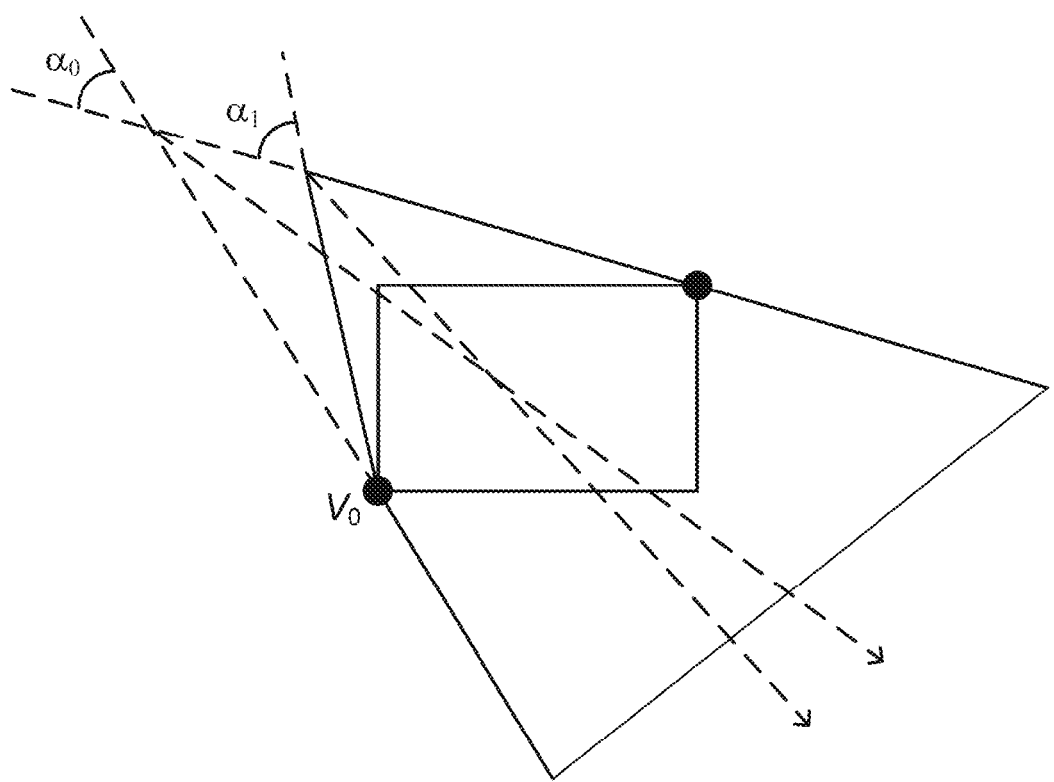
FIG. 6 is an exemplary diagram illustrating computation of a translation vector for iteratively moving a rectangle while enlarging the rectangle when one corner intersects the convex polygon at a vertex of the convex polygon.

For some convex polygons, one or more of the rectangle corners may intersect a vertex of the convex polygon during the iterative growth process. In such scenarios, the computing device 202 computes and employs a plurality of candidate translation vectors in an attempt to maximize the rectangle size. For example, referring next to FIG. 6, an exemplary diagram illustrates computation of a plurality of translation vectors when one corner of the rectangle intersects the convex polygon at a vertex of the convex polygon. In the example of FIG. 6, the bottom-left corner of the rectangle touches a vertex $V_0$ of the convex polygon. The computing device 202 measures or calculates two angles, such as $\alpha_0$ and $\alpha_1$, one for each of the edges having an endpoint at vertex $V_0$. The computing device 202 computes two candidate translation vectors, one for each of the angles $\alpha_0$ and $\alpha_1$. As described above with reference to operation of the vector component 218, the computing device 202 may execute two separate, iterative move and grow operations, one for each of the candidate translation vectors to compare the inscribed rectangle sizes resulting therefrom. The larger of the two inscribed rectangle sizes is selected as the maximum inscribed size, and the process terminates. In other embodiments, one of the candidate translation vectors is chosen and, if the subsequent iterative move and grow operations result in an increase in size of the rectangle, the other candidate translation vectors are not used.

In still another embodiment, the computing device 202 selects the "best" candidate translation vector for growing the rectangle. The "best" candidate translation vector corresponds to, for example, the vector that will enable the rectangle to grow the largest. In some embodiments, the set of candidate translation vectors may be reduced to one by geometrical analysis. In the example of FIG. 6, the computing device 202 ignores $\alpha_1$ because the rectangle has room to move only in the direction of "widening" lines (e.g., $\alpha_0$).

Aspects of the disclosure are operable with computing any quantity of candidate translation vectors and selecting the candidate translation vector that produces the largest rectangle area. For example, in some scenarios, each of two corners of the rectangle may intersect at vertices of the convex polygon at the same time. In such scenarios, the computing device 202 may compute four candidate translation vectors and (1) select the "best" candidate translation vector to use and then ignore the other candidate translation vectors, (2) select any one of the candidate translation vectors and ignore the other candidate translation vectors if the rectangle grows in size, or (3) fork or spawn four separate move and grow processes to compare four rectangle areas resulting from the four candidate translation vectors.

Figure 7:
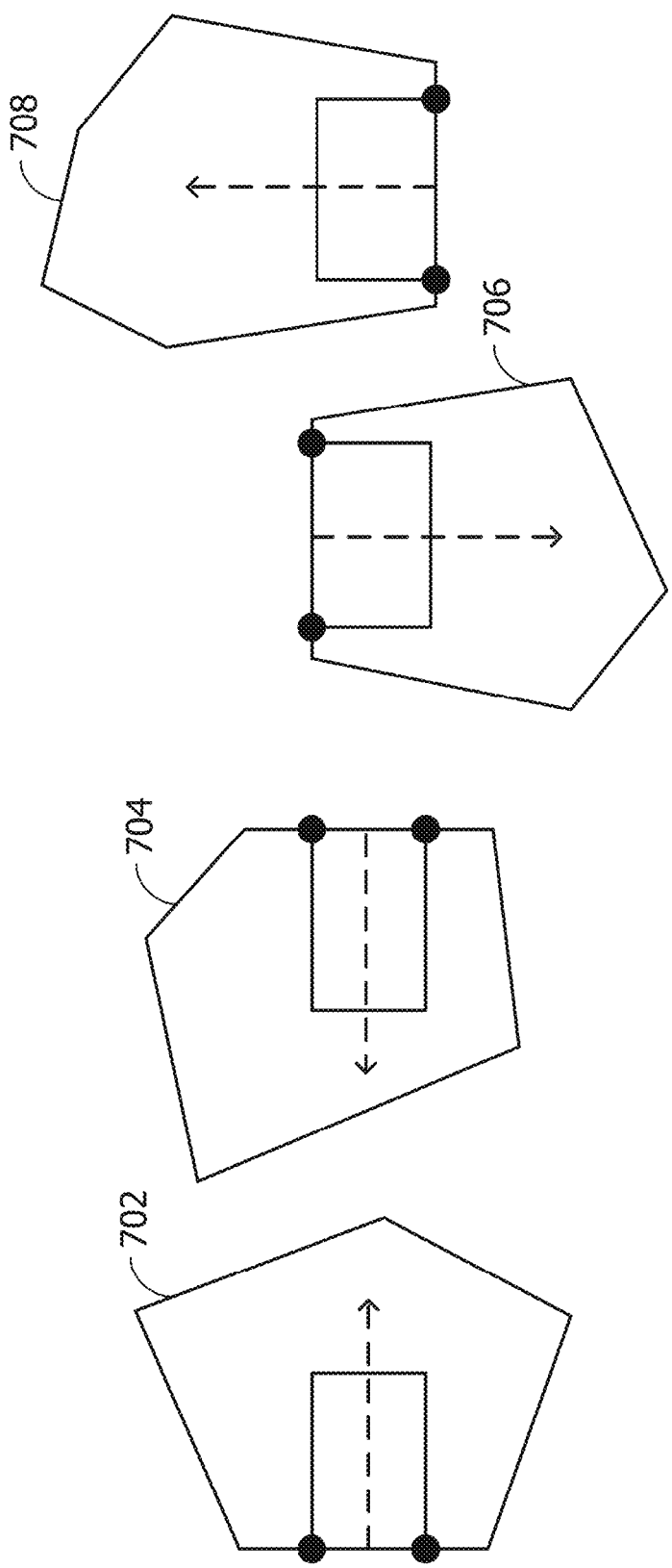
FIG. 7 is an exemplary diagram illustrating computation of translation vectors for moving a rectangle when two corners intersect the same edge of the convex polygon.

Other scenarios are contemplated by aspects of the disclosure. For example, two corners of the rectangle may intersect the same edge of the convex polygon. Referring next to FIG. 7, an exemplary diagram illustrates computation of translation vectors for moving the rectangle in such an example. In each of the example polygons 702, 704, 706, 708 in FIG. 6, the computing device 202 computes a translation vector that is perpendicular to the edge of the convex polygon 702, 704, 706, 708 that intersects with the rectangle. In other embodiments, the computing device 202 uses any of the two corners that intersect the edge of the convex polygon as a new center of growth (e.g., similar to the scenario in which only one corner touches).

Additional Examples

In some embodiments, the computing device 202 manipulates the camera 206 or other sensor for low-level optimization of computational photography techniques such as high dynamic range photography. For example, the computing device 202 may execute a scheduler that orders the capture of multiple images 102 in a way that optimizes (e.g., reduces) the quantity of sensor resets. An exemplary ordering includes the camera 206 capturing the plurality of images 102 by performing a plurality of sensor readouts during a single exposure of the camera 206. This reduces the wait time between image 102 captures and reduces and/or eliminates ghosting or other artifacts (e.g., caused by motion) in the images 102. Further, by overlapping the exposures, some embodiments may omit alignment of the images 102.

Aspects of the disclosure contrast with some of the existing systems in which the sensor is reset after sensor values are read out at a particular setting (e.g., exposure). In such embodiments, to take a set of photographs at different exposure times, the sensor accumulates for at least the sum of the exposure times plus the sensor reset times. For example, if the exposure times are 100 ms, 200 ms, and 300 ms and the sensor reset time is 30 ms, the total capture time with some of the existing systems is shown in Equation (1) below.

$$100+30+200+30+300+30=690 \text{ ms} \quad (1)$$

In contrast, with the cumulative readout embodiment of the disclosure, the exposure times overlap and only a single reset is incurred instead of a reset after each readout. In this embodiment, the total capture time is shown in Equation (2) below, which represents a significant reduction from the total in Equation (1) above.

$$100+100+100+30=330 \text{ ms} \quad (2)$$

In other embodiments, aspects of the disclosure leverage per-pixel readout circuitry available via complementary metal-oxide-semiconductor (CMOS) processes to preserve, maximize, or opportunistically leverage available electron charge. Typically, photons hit the sensors' pixels which then convert the energy into free electrons (e.g., photoelectric effect). The free electrons are fed to a readout circuit via analog/digital converters. With existing systems, the electrons are not conserved in the pixel wells during readout. As such, subsequent readouts using the existing systems are lower than expected and with more noise.

A typical CMOS sensor has a Bayer pattern mask covering the pixels and allows the user to generate an RGB image for each pixel, as shown in Table 1 below.

TABLE 1

| RGB Image Generated by CMOS Sensor for Each Pixel. | |
|---|---|
| GREEN | RED |
| BLUE | GREEN |

With aspects of the disclosure, each pixel is dynamically grouped into a new formation depending on the next highest perfect square corresponding to the number of readouts. This formation may be referred to as a "super pixel." For example, if three readouts are to be performed, the next highest perfect square is four. For a readout schedule of 100 ms (A), 200 ms (B), and 300 ms (C), such as described in the example above, a dynamically assigned layout pattern and readout patterns are shown below in Table 2.

TABLE 2

| Example Layout Pattern and Readout Patterns. | | | | | | | | | | |
|---|---|---|---|---|---|---|---|---|---|---|
| Layout Pattern | A | B | A | B | A | B | A | B | A | B | ... |
| | C | A | C | A | C | A | C | A | C | A | ... |
| | A | B | A | B | A | B | A | B | A | B | ... |
| Readout pattern at 100 ms (A) | A | | A | | A | | A | | A | | ... |
| | | A | | A | | A | | A | | A | ... |
| | A | | A | | A | | A | | A | | ... |
| Readout pattern at 200 ms (B) | | B | | B | | B | | B | | B | ... |
| | | B | | B | | B | | B | | B | ... |
| Readout pattern at 300 ms (C) | C | | C | | C | C | | | C | | ... |

The example readout patterns shown in Table 2 above may also be interleaved such that, for example, the pixels read at 100 ms may be read also at 200 ms and 300 ms via a per-pixel scheduler. The patterns shown in Table 2 above may be extrapolated to any quantity of readouts and to the corresponding next highest perfect square size of "super pixels." In some embodiments, the tradeoff is a modification of the resolution in both the horizontal and vertical direction in inverse proportion to the size of the "super pixel." In the example above, the "super pixel" size is 4 and reduces the effective resolution four times.

In assigning readouts, zero or more spare pixels per perfect square block may be proportionally assigned to the shorter exposures to average out noise, in non-interleaved readout implementations. In interleaved readout implementations, the free pixels may be used to further compress the readout schedule.

At least a portion of the embodiments described above may be implemented via hardware modifications in a back-side-illumination process to support discontinuous readout with minimal effect on image quality. Alternatively or in addition, at least a portion of the embodiments described above may be implemented in software or firmware such as computer-executable instructions that rearrange or otherwise define readout patterns to, at least, reduce and/or eliminate (1) wait time between image 102 captures and (2) ghosting or other artifacts in the images 102.

For example, given a desired quantity of readout times or intervals, aspects of the disclosure dynamically:
  group each pixel into a formation based on the next highest perfect square corresponding to the number of readouts;
  assign a layout pattern based on the formation thus defining readout patterns for each of the readout times; and
  perform the readouts at the readout times according to the assigned layout pattern.

At least a portion of the functionality of the various elements in FIG. 2 may be performed by other elements in FIG. 2, or an entity (e.g., processor, web service, server, application program, computing device, etc.) not shown in FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users 204. In such embodiments, notice is provided to the users 204 of the collection of the data (e.g., via a dialog box or preference setting) and users 204 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 204 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for compensating for global motion by determining the maximum inscribed size of the rectangle within the convex polygon, and exemplary means for compensating for global motion by determining the maximum inscribed size of the rectangle within the convex polygon defined from a burst capture of the plurality of images 102 by the camera 206 for bracketed photography.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a camera;
   a memory area associated with a mobile computing device; and
   a processor programmed to:
      receive a request to capture a plurality of images with the camera;
      during a single exposure of the camera, executing a plurality of sensor readouts corresponding to the plurality of images; and
      applying a single sensor reset upon execution of the plurality of sensor readouts.

2. The system of claim 1, wherein the processor is further programmed to capture the plurality of images based on executing the plurality of sensor readouts during the single exposure of the camera.

3. The system of claim 1, wherein the plurality of sensor readouts occur without a sensor reset incurred between the plurality of sensor readouts.

4. The system of claim 1, wherein the number of sensor readouts is predefined.

5. The system of claim 4, wherein the processor is further programmed to:
   group each pixel in the plurality of images into a formation based on a next highest perfect square corresponding to the predefined number of readouts;
   assign a layout pattern based on the formation; and
   perform the predefined number of readouts according to the assigned layout pattern.

6. The system of claim 5, wherein performing the predefined number of readouts is at readout times according to the assigned layout pattern.

7. The system of claim 6, wherein the processor is further programmed to define readout patterns for the readout times for the plurality of sensor readouts based on the assigned layout pattern.

8. A method comprising:
   receiving a request to capture a plurality of images with a camera;
   during a single exposure of the camera, executing a plurality of sensor readouts corresponding to the plurality of images; and
   applying a single sensor reset upon execution of the plurality of sensor readout.

9. The method of claim 8, further comprising capturing the plurality of images based on executing the plurality of sensor readouts during the single exposure of the camera.

10. The method of claim 8, wherein the plurality of sensor readouts occur without a sensor reset incurred between the plurality of sensor readouts.

11. The method of claim 8, wherein the number of sensor readouts is predefined.

12. The method of claim 11, further comprising:
   grouping each pixel in the plurality of images into a formation based on a next highest perfect square corresponding to the predefined number of readouts;
   assigning a layout pattern based on the formation; and
   performing the predefined number of readouts according to the assigned layout pattern.

13. The method of claim 12, wherein performing the predefined number of readouts is at readout times according to the assigned layout pattern.

14. The method of claim 13, further comprising defining readout patterns for the readout times for the plurality of sensor readouts based on the assigned layout pattern.

15. One or more computer-readable storage devices having computer-executable instruction that when executed by a processor, cause the processor to:
   receive a request to capture a plurality of images with a camera;
   during a single exposure of the camera, execute a plurality of sensor readouts corresponding to the plurality of images; and
   apply a single sensor reset upon execution of the plurality of sensor readout.

16. The one or more computer-readable storage devices of claim 15, wherein the computer-executable instructions further cause the processor to capture the plurality of images based on executing the plurality of sensor readouts during the single exposure of the camera.

17. The one or more computer-readable storage devices of claim 15, wherein the plurality of sensor readouts occur without a sensor reset incurred between the plurality of sensor readouts.

18. The one or more computer-readable storage devices of claim 15, wherein the number of sensor readouts is predefined.

19. The one or more computer-readable storage devices of claim 18, wherein the computer-executable instructions further cause the processor to:
   group each pixel in the plurality of images into a formation based on a next highest perfect square corresponding to the predefined number of readouts;
   assign a layout pattern based on the formation; and
   perform the predefined number of readouts at readout times according to the assigned layout pattern.

20. The one or more computer-readable storage devices of claim 19, wherein the computer-executable instructions further cause the processor to define readout patterns for the readout times for the plurality of sensor readouts based on the assigned layout pattern.

* * * * *